United States Patent [19]

Austen et al.

[11] 4,341,827

[45] Jul. 27, 1982

[54] BIAXIALLY ORIENTED THERMOPLASTIC POLYMER FILM AND METHOD OF MANUFACTURE

[75] Inventors: Alfred A. Austen, Center Valley; Darral V. Humphries, Allentown, both of Pa.

[73] Assignee: Bethlehem Steel Corporation, Bethlehem, Pa.

[21] Appl. No.: 288,575

[22] Filed: Jul. 30, 1981

Related U.S. Application Data

[63] Continuation-in-part of Ser. No. 72,807, Sep. 5, 1979, Pat. No. 4,282,277, which is a continuation-in-part of Ser. No. 941,116, Sep. 8, 1978, abandoned.

[51] Int. Cl.³ .................. B29C 23/00; F16L 9/12; B32B 27/06; B32B 27/32; C08F 110/06; C08F 38/00; C08F 22/26; C08F 36/00

[52] U.S. Cl. .................. 428/36; 138/137; 138/140; 138/177; 264/323; 264/570; 264/514; 428/220; 428/474.4; 428/480; 428/523; 428/524; 526/270; 526/309; 526/323; 526/335; 526/348.1; 526/351; 524/425; 524/427; 524/449; 524/451; 524/557; 524/582; 524/584; 524/585; 524/586; 524/587; 524/593; 524/604; 524/605; 524/606

[58] Field of Search .................. 428/36, 220, 474.4, 428/523, 524, 480, 910; 260/37 N, 37 R, 40 R, 40 P, 42.46; 526/348.1, 309, 323, 335, 351, 270; 264/323, 570, 514; 138/137, 140, 177

[56] References Cited

U.S. PATENT DOCUMENTS

| | | | |
|---|---|---|---|
| 3,198,866 | 8/1965 | Covington, Jr. et al. | 264/297 |
| 3,205,290 | 9/1965 | Covington, Jr. et al. | 264/292 |
| 3,215,590 | 11/1965 | Purvis | 428/324 |
| 3,440,130 | 4/1969 | Telkes | 428/402 |
| 3,475,245 | 10/1969 | Bearer | 428/36 |
| 3,507,941 | 4/1970 | Kies et al. | 264/570 |
| 3,642,976 | 2/1972 | Buckley et al. | 264/323 |
| 3,767,757 | 10/1973 | Vroom et al. | 264/570 |
| 3,784,660 | 1/1974 | Hardy | 264/570 |
| 3,896,200 | 7/1975 | Wiley et al. | 264/532 |
| 3,907,961 | 9/1975 | Carrow | 264/166 |
| 3,923,943 | 12/1975 | Iriko et al. | 264/532 |
| 3,929,959 | 12/1975 | Findlag et al. | 264/292 |
| 4,002,709 | 1/1977 | Mozer | 264/532 |
| 4,042,747 | 8/1977 | Breton et al. | 428/402 |
| 4,056,591 | 11/1977 | Goettler et al. | 264/177 R |
| 4,282,277 | 8/1981 | Auster et al. | 428/36 |

Primary Examiner—William R. Dixon, Jr.
Attorney, Agent, or Firm—Joseph J. O'Keefe; Charles A. Wilkinson; John S. Simitz

[57] ABSTRACT

The invention is directed to biaxially oriented thermoplastic polymer flexible film having a substantially uniform thickness between about 0.005 and 0.030 of an inch (0.13 mm and 0.76 mm) and characterized by a structure comprised of discrete, platelet-like spherulitic crystalline aggregates compressed transversely to the plane of the film and biaxially oriented in the plane of the film and having a combination of improved properties and also to a rigid conduit or extrudate having a plurality of thermoplastic crystalline polymer layers each of which has a unique microstructure and improved properties.

The film is produced by solid state hydrostatic extrusion of a generally cylindrical preform comprised of a plurality of concentric tubular-like discrete layers of polymers through an extrusion zone having converging walls and a diverging geometry, wherein the discrete layers in the preform are substantially simultaneously circumferentially expanded and axially elongated by compressive forces to produce an oriented polymer rigid tubular extrudate comprised of a plurality of concentric tubular-like layers of oriented polymer. The tubular extrudate or preform is slit longitudinally so that the discrete layers of the extrudate can be separated into individual films.

35 Claims, 10 Drawing Figures

BIAXIALLY ORIENTED THERMOPLASTIC POLYMER FILM AND METHOD OF MANUFACTURE

CROSS-REFERENCES OF THE INVENTION

This application is a continuation-in-part of our application Ser. No. 072,807 filed Sept. 5, 1979 now U.S. Pat. No. 4,282,277, entitled "An Oriented Semi-Crystalline Polymer Product and Method and Apparatus for Producing Such Product", which is a continuation-in-part application of Ser. No. 941,116 filed Sept. 8, 1978 in the names of Alfred R. Austen and Darral V. Humphries, entitled "An Oriented Crystalline Polymer Product and Method and Apparatus for Producing Such Product", now abandoned.

BACKGROUND OF THE INVENTION

This invention relates to biaxially oriented rigid conduit or extrudate characterized by having a unique deformed spherulitic microstructure and improved physical and mechanical properties and to biaxially oriented flexible film which retains the unique microstructure and improved physical properties of the extrudate and to a method for producing the conduit and film.

As discussed in the prior applications, relatively thick, rigid thermoplastic polymer sheet can be produced by solid state hydrostatic extrusion of a thermoplastic polymer preform into a rigid, thick-walled conduit having a desired wall thickness, slitting the conduit and heat-flattening the slit conduit. It is also possible to produce such sheet by solid state hydrostatic extrusion of a slit thermoplastic polymer preform to produce a slit extrudate and heat-flattening the extrudate. However, it has not been readily possible to produce thermoplastic polymer flexible films by this described method.

In the method for producing thick, rigid thermoplastic polymer sheet by solid state hydrostatic extrusion a thermoplastic crystalline polymer preform is heated to a desired temperature between its 4.64 kilograms of force per square centimeter deflection temperature and 8° C. below its crystalline melt temperature and is extruded by hydrostatic pressure through an extrusion zone having converging walls, a converging cross-section and a diverging geometry. The extrusion pressure in the fluid is maintained by sealing means which allows a thin layer of fluid to be extruded on the outer surfaces of the preform to act as a lubricant. The preform is expanded circumferentially and elongated axially to produce a rigid conduit or extrudate having a relatively thick wall. The extrudate is cooled as it emerges from the expansion zone. Cooling stabilizes the polymer and reduces its inherent tendency to spring back to its original shape.

During extrusion the wall thickness of the preform is decreased and the extrusion pressure increases because the ratio of the volume of the preform divided by the contact area in the extrusion zone decreases, thereby causing the extrusion zone-to-workpiece friction to consume a greater portion of the process energy. Hence, increased pressure for extrusion is required. Also, because the preform is heat softened the extrudate exiting from the extrusion zone is hot and relatively soft and becomes flexible due to the reduced wall thickness and is very difficult to handle without wrinkling or distortion. This difficulty could be overcome by stretching the extrudate but such stretching would destroy the spherulitic crystalline aggregate structure of the thermoplastic crystalline polymer. Therefore, stretching cannot be applied to an extrudate if the spherulitic crystalline aggregate structure of the polymer is to be retained.

In order to maintain satisfactory uniformity of extrudate thickness it is necessary to maintain the dimensional tolerances for the tooling which comprises the extrusion zone. Such dimensional tolerances become even more critical when extruding relatively thin walls and the setup and alignment of the tooling becomes critical and expensive.

If the extrudate exit velocity remains constant, the throughput rate in pounds per hour drops proportionately to the extrudate thickness hence the production costs per unit weight are increased.

In short, the complexity of the equipment required to produce polymer film by solid state hydrostatic extrusion becomes greater and the cost of production prohibitive. Additionally, production costs increase as the thickness of the polymer extrudate decreases.

In accordance with this invention the above problems can be avoided and polymer film can be produced by solid state hydrostatic extrusion by using a preform which is comprised of a plurality of concentric tubular-like discrete continguous layers of thermoplastic crystalline polymers and forming a multilayer, rigid extrudate whose layers are concentric flexible films.

Thermoplastic polymer film conventionally is produced by the blown tubular or flat die methods. In the blown tubular or bubble method, molten polymer is extruded vertically generally in an upward direction through an annular orifice or ring die into tubular form which is solidified and passed through nip rolls which apply tension to the polymer and flatten the tube. The tube is collected on windup rolls. The molten polymer is cooled as it leaves the annular orifice by a fluid, usually air, blown against its outer surface and by a gaseous bubble formed in the interior of the tubular extrudate. The circumferential expansion of the polymer by the bubble and the axially elongation by the nip rolls stretch the polymer to produce a biaxially oriented film. The film width and thickness are controlled by regulating the opening of the annular orifice. The unconstrained circumferential and axial stretching of the polymer results in at least partial destruction of the original spherulitic crystalline aggregate structure of the polymer.

In the production of polymer film by the flat die method, molten polymer is extruded through a flat or "T"-shaped die into water or over several chill rolls to solidify and "set" the polymer. The solidified film is passed over another series of rolls and through nip rolls to apply tension to the film. The speed of collecting the film on take-up rolls results in film thinning and results in uniaxial orientation of the polymer structure. Film so produced can be biaxially oriented by stretching the film in a direction substantially perpendicular to the axial direction. Tensioning or stretching the film does orient the structure but also destroys the original spherulitic crystalline aggregate structure of the polymer.

Very thin film, for example as thin as 0.0001 inch, can be produced by the conventional processes described above but such film is difficult to handle. Special techniques and equipment are required to maintain film flatness and to prevent excessive rejects during processing, thereby increasing the costs of producing such film.

It is known that by orienting the structure of a thermoplastic crystalline polymer both the physical and mechanical properties of the polymer are improved. Orientation, whether uniaxial or biaxial, has always been achieved by tensioning or stretching methods as noted above. Stretching or tensioning processes cause non-homogeneous deformation of the original spherulitic crystalline aggregate structure of the thermoplastic crystalline polymer. As stress is applied to the polymer, initially the aggregates are deformed elastically. As stress is increased the aggregates are elongated, tilted and eventually disrupted and separation of lamellae occurs. The appearance of the original spherulitic crystalline aggregate structure is thus more or less destroyed. Microvoids, microfibrils and eventually fibrils are formed in the polymer. Defects, such as microvoids, which may be present in the extruded molten polymer, are aggravated. If the polymer contains filler material, for example mineral particles and glass fibers, stretching can cause the matrix polymer to be separated from the filler material causing microvoids and discontinuities in the sheet.

There is no known method for producing thermoplastic crystalline polymer film which retains the original spherical crystalline aggregate structure of the polymer while orienting the polymer structure and to improve its properties. Nor is there a known method to produce a filled thermoplastic crystalline polymer film in which the resin matrix microstructure is oriented.

It is therefore the object of this invention to provide thermoplastic polymer film having a substantially uniform thickness within a range between about 0.005 and 0.03 of an inch (0.13 mm to 0.76 mm) and which is characterized by a structure comprised of spherulitic crystalline aggregates which are biaxially oriented in the plane of the film and are compressed in a plane transverse to the plane of the film, has improved ultimate tensile strength, improved tensile impact strength particularly at low temperatures, improved thermal conductivity in the plane of the film and permeability through the film which is less than the non-oriented polymer or a film of comparable biaxially oriented structure produced by stretch processing and a density at least equal to the density of the non-oriented polymer.

It is a further object of this invention to provide a method for producing such biaxially oriented films by solid state hydrostatic extrusion.

It is also another object of this invention to provide a method for producing such thermoplastic crystalline polymer film having increased orientation and improved properties wherein a multilayered polymer preform is initially extruded by solid state hydrostatic extrusion into a tubular multilayered rigid extrudate and re-extruding the extrudate at least once again to form a multilayered extrudate whose layers are separable into flexible films.

It is another object of this invention to provide a thermoplastic crystalline polymer film which contains at least 5 weight percent and as much as 80 weight percent particulate filler material, which film is characterized by having a biaxially oriented spherulitic crystalline aggregate structure and which is substantially free from process-induced defects.

It is still another object of this invention to provide a rigid, thick-walled, multi-layered polymer conduit the layers of which are concentric, tubular, discrete, flexible films, each film being biaxially oriented and which film may contain between 5 and 80 weight percent particulate filler material, each film being characterized by a structure comprised of spherulitic crystalline aggregates biaxially oriented in the plane of the film and compressed in a plane transverse to the plane of the film and having improved ultimate tensile strength and tensile impact properties particularly at low temperature and improved thermal conductivity in the plane of the film.

SUMMARY OF THE INVENTION

According to this invention, there is provided a biaxially oriented thermoplastic crystalline polymer film which has a thickness between 0.005 and 0.030 of an inch (0.13 mm and 0.76 mm) and is characterized by having a unique structure which retains the original structure of spherulitic crystalline aggregates which are biaxially oriented in the plane of the film and compressed in a plane transverse to the plane of the film and which has improved tensile strength and tensile impact properties particularly at low temperatures, is less gas permeable through the film and has improved thermal conductivity in the plane of the film when compared to the non-oriented polymer or to the same or similar thermoplastic crystalline polymer biaxially oriented to the same orientation in stretch processing, and has essentially the same density as the non-oriented thermoplastic crystalline polymer from which it was made.

These films can contain between 5 and 80 weight percent filler particles, such as mica, talc and the like, to improve stiffness, and other additives such as colorants, anti-static agents, flame retardants and the like.

These films are produced by the solid state hydrostatic extrusion of a generally tubular-like thermoplastic preform comprised of a plurality of concentric tubular-like discrete thermoplastic crystalline polymer layers joined together at least at their rear portions by suitable means, for example fusion welding, adhesion, interlocking and the like. The preform is hydrostatically extruded in the solid state through an extrusion zone comprised of converging walls, converging cross-sectional area and diverging geometry wherein each of the thermoplastic crystalline polymer layers is substantially simultaneously expanded circumferentially and elongated longitudinally by compressive forces to produce a rigid conduit or extrudate comprised of a plurality of concentric tubular-like discrete layers of flexible films. Either the preform or extrudate can be slit axially so that the concentric layers of film can be separated. The extrudate layers need not be separated but may be joined together to form a flexible film containing at least two such biaxially oriented layers. The layers may be comprised of the same or different thermoplastic crystalline polymers by forming the preform from the same or different polymers.

Film having increased orientation and improved properties can be made by forming such extrudate by multiple extrusions of the preform.

FIGURES OF THE INVENTION

PREFERRED EMBODIMENT OF THE INVENTION

In accordance with this invention there is provided biaxially oriented thermoplastic crystalline polymer film characterized by a unique structure of spherulitic crystalline aggregates compressed in a plane transverse to the plane of the film and oriented in the plane of the film i.e. planar oriented, and which has improved ultimate tensile strength, improved tensile impact strength at high and low temperatures, improved thermal conductivity in the plane of the film, and less gas permeability through the film when compared to the same non-oriented thermoplastic crystalline polymer from which it was processed and to a similar polymer which is non-oriented or biaxially oriented by conventional stretching means and has a density substantially the same as that of the non-oriented thermoplastic crystalline polymer from which it was processed. The structure is substantially devoid of any process-induced microvoids and microfibrils in the plane of the film. The ratio of the tensile impact strength to ultimate tensile strength (TIS/UTS) is at least 50 percent greater than that ratio determined for the same polymer composition which is biaxially oriented by conventional melt extrusion-stretching processes to the same ultimate tensile strength level. The biaxially oriented film of the invention has a tensile impact strength at −45 C which is not less than 20 percent of its tensile impact strength at 24 C and the tensile impact strength at 24 C which is at least five times and an ultimate tensile strength which is at least one and three quarters that of the corresponding polymer in the non-oriented state.

In these specifications the term film is used to include sheet material and is defined as a biaxially oriented thermoplastic crystalline polymer which is very thin when compared to its length and breadth and includes thicknesses between 0.005 and 0.030 of an inch (0.13 and 0.76 mm). The film may be generally classified as flexible. Broadly, the film can have a substantially uniform thickness ranging from about 0.005 to about 0.030 of an inch (0.13 and 0.76 mm). It is preferred that the film have a thickness of 0.010 to 0.030 of an inch (0.25 and 0.76 mm) and especially preferred to have a thickness of 0.015 to 0.030 of an inch (0.38 to 0.76 mm). The film may be comprised of a single polymer layer or a plurality of polymer layers, each layer may be comprised of the same or different compatible polymers.

When we use the term preform we mean a generally cylindrical article comprised of a plurality, i.e. at least two, concentric tubular-like layers, the outer surface of the inner layer being contiguous with the inner surface of the outer layer and being connected at least at their rear portions by any conventional means, such as fusion welding, to prevent axial movement of the layers independently of each other, each layer being of the same thermoplastic crystalline polymer or different compatible thermoplastic crystalline polymers. We may use the terms preform and billet interchangeably.

A rigid conduit or extrudate is a generally cylindrical article formed by at least one solid state hydrostatic extrusion of a polymer preform and comprised of a plurality of concentric tubular-like layers each of the layers being formed from a thermoplastic crystalline polymer layer in the preform, which layer has been substantially simultaneously circumferentially expanded and axially elongated and reduced in thickness, the expansion, elongation and reduction being substantially equal in all layers.

Compatible thermoplastic crystalline polymers are polymers which when mated in a preform can be heated to the temperature range herein described and will remain in the solid state, have coefficients of friction whereby stick-slip extension will not occur and which have flow characteristics whereby they can be hydrostatically extruded in the solid state and which can be separated into discrete entities after extrusion.

The polymer film of the invention may contain particles of a non-strengthening or non-stiffening filler material, for example colorants, flame-retardants, antioxidants and the like or stiffening materials, for example talc, calcium carbonate, mica, short fibers and the like. If the particles added are non-stiffening and non-strengthening fillers, the film may contain as little as 5 weight percent of the particles or an amount sufficient to accomplish the purpose for which they are added, for example for supplying color, to the polymer. If the particles are added for strengthening and, or stiffening purposes the film may contain as little as needed to serve the purpose. In the past, it has been very difficult, if not impossible, to produce film which has biaxially oriented resin structure in the presence of hard particles. It has also been virtually impossible even with the addition of hard particle grafting agents to prevent the formation of voids due to the separation of the matrix polymer and the added particles during stretch orientation. In the film of the invention, however, the added particles, and the structure may be biaxially oriented. Additionally, the matrix polymer is not "pulled-away" from the particles during orientation, therefore the film is substantially devoid of voids produced by process-induced separation of the matrix polymer from the filler particles.

The film of the invention is produced by a method in which a generally tubular-like preform comprised of a plurality, i.e. at least two and preferably 3 or more, e.g.

5, 10 and more discrete concentric tubular-like layers of the same or different thermoplastic crystalline polymers is hydrostatically extruded in a solid state into an extrudate or rigid conduit comprised of the same number of layers as in the preform. The concentric layers in the preform are fastened together by any one of several means, for example by fusion welding or dovetailing at their rear portions. The preform is heated to the requisite temperature and is hydrostatically extruded in a solid state through an extrusion zone characterized by having converging conical walls, a converging cross-section and a diverging geometry. Each layer in the preform is substantially simultaneously expanded circumferentially and elongated axially to form a multilayered conduit or extrudate. The extrudate can be slit axially by conventional means, for example a heatknife, so that the individual layers can be separated into separate films. Of course, the layers need not be separated but can be processed, for example with joining by spot welding, into a composite film comprised of at least two layers of thermoplastic crystalline polymers.

In the hydrostatic extrusion process the amount of work on each layer comprising the thickness of the preform may vary slightly, particularly if the composite wall thickness is large. Therefore, the reduction in the thickness of each layer may vary slightly. However, the variation is so slight that in most cases it can be ignored. There is a relationship between the thickness of each flexible film and the thickness of each layer in the preform from which it is produced, however many layers are involved. Since the amount of circumferential expansion and axial elongation is known, the reduction in thickness of each layer in the preform can be calculated by known equations derived from the principle of volume constancy. For example, an extrudate comprised of two flexible films each having a thickness of about 0.015 of an inch (0.38 mm) can be made by hydrostatically extruding a rigid preform having two layers, each layer having a thickness of 0.060 of an inch (1.52 mm) when the preform is expanded circumferentially and elongated longitudinally by 100 percent. Of course, the thickness of the films will vary dependent upon the amount of expansion and elongation of the layers in the preform.

Figures 1, 3, 4:
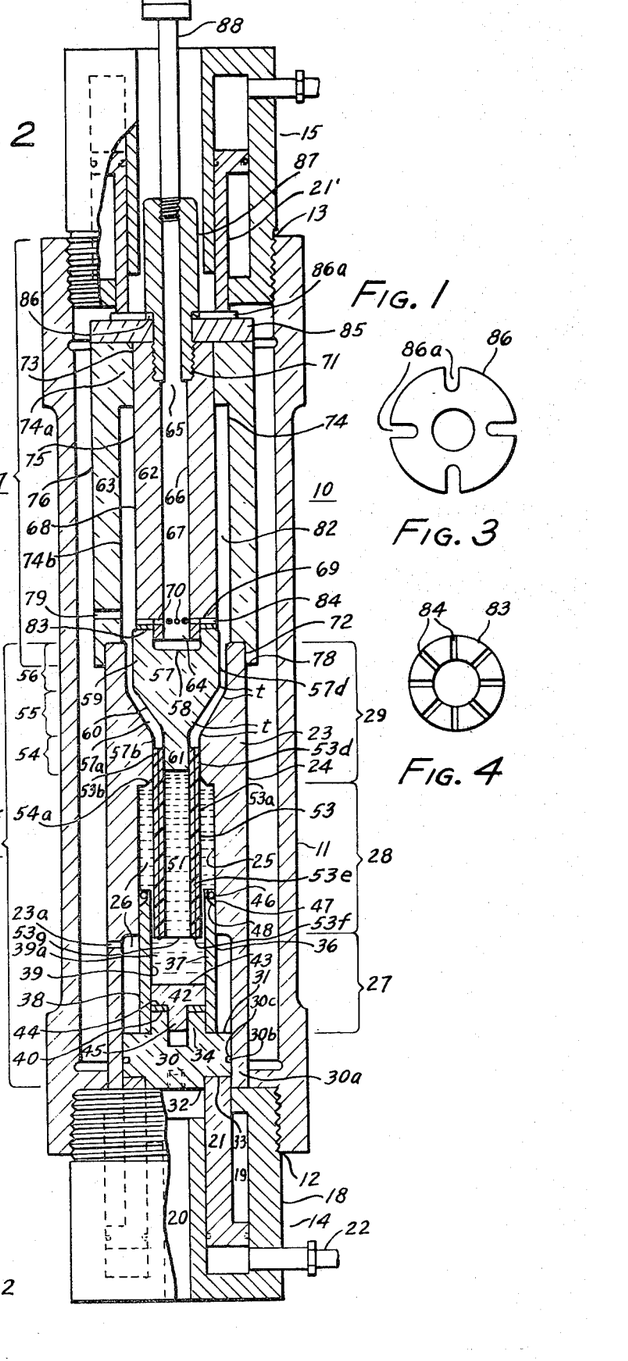
FIG. 1 is an elevation view in cross-section of a vertical batch extrusion apparatus, which may be used in the method of the invention, showing a preform comprised of two layers of non-oriented thermoplastic crystalline polymers in position at the start of the solid state hydrostatic extrusion process.
FIG. 3 is a top view of a slotted washer used in the apparatus of the invention.
FIG. 4 is a top view of a grooved washer used in the apparatus of the invention.
Figure 2:
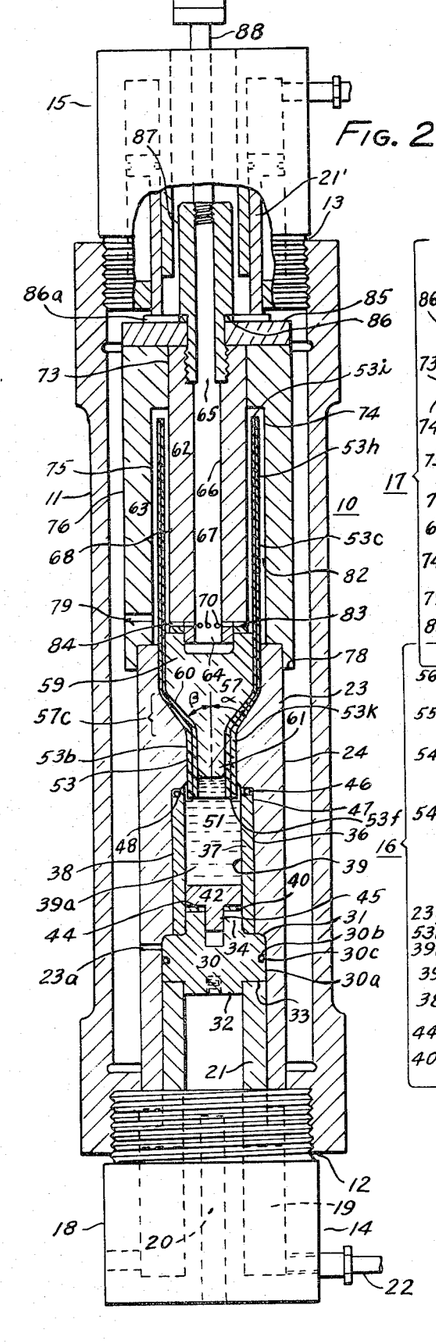
FIG. 2 shows the same apparatus as FIG. 1 after the preform has been extruded.

The method of the invention may be practiced by the apparatus shown, by way of example only, in FIGS. 1 and 2. FIG. 1 is a cross-sectional view in elevation of a vertical hydrostatic extrusion press 10 shown at the start of the extrusion process. FIG. 2 is a cross-sectional view of the extrusion press 10 at the finish of the extrusion process.

The hydrostatic extrusion press 10 comprises a cylindrical outer casing 11 having threaded open ends 12 and 13, a first hydraulic pressurizing means 14 and a second hydraulic pressurizing means 15, a preform or billet container assembly 16 and an extrudate or conduit receiving assembly 17 aligned in spaced relationship coaxially within said outer casing 11.

Since pressurizing means 14 and 15 are identical, only means 14 will be described. The pressurizing means 14 is a hydraulic apparatus comprising a cylinder 18 defining an annular chamber 19 with an axial bore 20. A hollow cylindrical piston 21 is positioned in chamber 19 whereby force is transmitted to a cylindrical plug 30 in the billet container assembly 16. Pressure is applied to the piston 21 from a source (not shown) through piping assembly 22.

The assembly 16 includes a cylindrical shell 23 coaxial within outer casing 11. The shell 23 has cylindrical outer surface 24 and a generally cylindrical inner surface 25. A vent 23a is provided in the shell 23 to vent pressure from cavity 26 during extension. The inner surface 25 defines an axial cavity or bore 26 which is divided into a first cylindrical section 27, an intermediate cylindrical section 28 and a third section 29. The first section 27 has a greater cross-sectional area than the intermediate section 28. A generally cylindrical plug 30 having the shape shown has generally parallel upper and lower surfaces 31 and 33, respectively, and a projection 32 extending downwardly from the lower surface 33. The lower surface 33 rests on and is contiguous with the piston rod 21. Extension 32 provides means to center the plug 30 on the piston rod 21. An O-ring 30c in groove 30b of wall 30a provides a friction means for keeping assembly 16 together after it has been assembled and during subsequent heating and insertion into the press 10. The upper surface 31 is provided with a cylindrical projection 34 generally U-shaped in cross-section as shown. A hollow cylindrical piston 36 comprised of metallic wall 37 having an outer surface 38 and an inner surface 39 defining an axial cavity 39a, is supported by plug 30 as shown. A circular elastomer seal washer 40 provides a seat for cylindrical piston head 42 having generally parallel upper and lower surfaces 43 and 44, respectively and also seals hydrostatic fluid 51 into the cavity 39a. A solid projection 45 extending downwardly from surface 43 provides means for centering piston head 42. A sealing O-ring 46 and a support ring 47 generally triangular in cross-section on shoulder 48 of the hollow piston 36 provide sealing means to prevent leakage of fluid 51. The piston 36 is supported on the upper surface 31 of the plug 30. The hydrostatic fluid 51 fills the cavity 39a of the intermediate section 28 and piston 36 and provides means for transmitting pressure to a generally tubular-like or cylindrical thermoplastic polymer preform 53 comprised of at least two concentric layers 53d and 53e of the same or different thermoplastic crystalline polymers in the assembly 16. The layers 53d and 53e are fastened together on the rear surface 53g by fusion welding shown at 53f. During extrusion, a very thin film of the hydrostatic fluid 51 is extruded on the surfaces 53a and 53b of the preform 53 to thereby provide lubrication for extrusion. The third section 29 is the die of the apparatus 10 and is comprised of a converging conical entrance 54a, a generally cylindrical axial land surface 54, a generally conical diverging wall surface 55 and a generally cylindrical axial land surface 56 substantially parallel to the land surface 54. The land surface 56 may be any length sufficient to aid in setting the extrudate 53c comprised of layers 53h and 53i. The diameter of land surface 54 is smaller than the diameter of land surface 56. A mandrel head 57 having a recessed base surface 58, a cylindrical lower portion 59 and a conical upper portion 60 tapering into an elongated cylindrical nose portion 61, is positioned axially within the annulus formed by the die 29. The nose portion 61 is of a size such that when inserted into the bore or inner surface 53a of the preform 53, an interference fit is produced which is sufficiently strong to keep the mandrel head 57 in position while assembly 16 is being assembled and to maintain the position of the mandrel head 57 during subsequent heating and insertion into the press 10. The outside surface 53b of the preform 53 contacts land surface 54 to thereby form a seal which prevents leakage of hydrostatic fluid 51 during subsequent heating and assembly of the apparatus 10. The surface of die 29 and surface of the mandrel head 57 are spaced a desired distance apart to form an annular orifice or extrusion zone 57a which has a generally converging conical entrance 54a and three zones: a sealing zone 57b formed by the annular cylindrical land surface 54 and the surface of cylindrical nose 61 respectively, a conical expansion zone 57c (FIG. 3) having a converging cross-sectional area formed by diverging wall surface 55 and the surface of conical portion 60, respectively, and a cylindrical sizing zone 57d formed by the land surface 56 and the surface of portion 59. The transition zones t between the surfaces of the sealing zone 57b and the expansion zone 57c and the sizing zone 57d on the die and mandrel-head respectively are provided with curved surfaces having predetermined radii to provide smooth transition areas between any two zones. The angle α that the diverging wall surface 55 makes with the axis of the press 10 may be between 45° and 15° and the angle β that the surface of conical portion 60 makes with the axis of press 10 may vary between 50° and 20°. The angle α and the angle β are chosen so that diverging wall surface 55 and the surface of conical section 60 will meet if extended, i.e. the annular orifice formed by these surfaces is generally converging and has a converging cross-sectional area while being diametrically diverging. It is preferred that the angle α be about 30° and the angle β be about 40°. The preform 53 has a total diameter which is slightly larger than the diameter of surface 54. When extruded, the outer surface 53b of the preform 53 contacts surface 54 to form a seal which holds the hydrostatic fluid 51 in the assembly 16 to maintain extrusion pressure but at the same time allows a thin film of fluid 51 to be extruded on the surface of the preform 53 to thereby provide lubrication during extrusion. As the preform 53 enters the zone 57c, each layer 53d and 53e of the preform is substantially simultaneously expanded circumferentially and elongated axially and flows to the sizing zone 57d. It is possible to vary the axial elongation of the thermoplastic polymers while keeping the circumferential expansion constant by varying the distance between the conical surface of the mandrel-head and the wall surface 55.

The extrudate receiving assembly 17 includes an outer shell 63 coaxially within and spaced from casing 11 and a cylindrical hollow mandrel 62 coaxially within shell 63. The mandrel 62 has an open lower end and an open upper end 64 and 65, respectively, an inner surface 66 defining a cylindrical bore 67 and an outer surface 68. A shoulder 69 and a plurality of radial orifices 70 extending from inner surface 66 to outer surface 68 are formed in lower end 64. The upper end 65 has a greater cross-sectional area than the remainder of the bore 67 and is provided with threads 71. Outer shell 63 has an open lower end 72 and an open upper end 73, an outer surface 76 and a generally cylindrical inner surface 74 defining a generally cylindrical bore 75. The inner surface 74 has an upper portion 74a and a lower portion 74b. A shoulder 78 is formed on end 72. A plurality of radial orifices 79 extend from the lower surface 74b to the outer surface 76. The upper portion 74a is contiguous with the outer surface 68. The lower portion 74b and outer surface 68 are spaced apart to provide a chamber 82 to receive the conduit or extrudate 53c.

Figure 5:
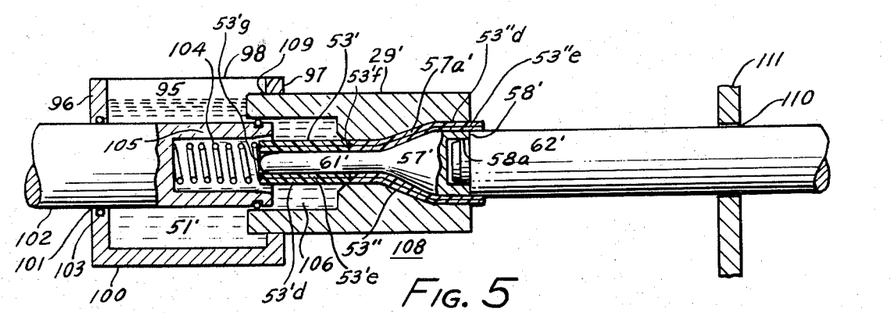
FIG. 5 is a schematic view in cross-section of a second embodiment of an apparatus which may be used in a semi-continuous process for hydrostatically extruding in the solid state a preform comprised of two layers of thermoplastic crystalline polymers.

The mandrel 62 is separated from the mandrel head 57 by a grooved washer 83, shown in FIG. 5. A plurality of radial grooves 84 communicate with the orifices 70 to provide uninterrupted passageways between the bore 67 and the chamber 82.

A circular bearing plate 85 having an outer diameter equal to the diameter of the outer shell 63 and an axial opening having a diameter equal to the diameter of the upper end 65 of the mandrel is contiguous with the ends 74a and 73, respectively. A slotted washer 86, shown in FIG. 4, is inserted between bearing plate 85 and piston 21' in the hydraulic cylinder 15. A hollow plug 87 and pipe assembly 88 are attached to the mandrel 62 as shown whereby a lubricating and/or cooling fluid may be introduced into the assembly 17. The plug 87 is spaced a distance from piston rod 21' to provide a passage for the lubricating and/or cooling fluid.

To extrude a preform 53 which is comprised of at least two thermoplastic crystalline polymers 53c and 53d, for example isotactic polypropylene and polyethylene, the preform 53 is inserted into the shell 23 so that the outer surface 53b of the preform 53 contacts the land surface 54b. The nose 61 of the mandrel-head 57 is inserted into the bore 53a of the preform 53 to make a tight fit. Piston 36 and seal parts 46 and 47 are inserted into section 28. A quantity of a hydrostatic fluid 51, for example castor oil, is poured into the sub-assembly. The sub-assembly is placed in an oven and is heated to a temperature which is between the 4.64 kilograms force per square centimeter (66 pounds per square inch) heat deflection temperature and 8 C. (14 F.) below the crystalline melt temperature of the lowest melting polymer, for example in the case of polypropylene, the temperature is 129 C. (265 F.). Piston head 42 and seal washer 40 are preheated to the same temperature. When at the desired temperature, piston head 42 and washer 40 are inserted into the bottom portion of piston 36. Plug 30 and O-ring 30b also heated to the desired temperature and protrusion 34 is inserted into piston 36 thereby forming assembly 16. The heated assembly 16 is lowered into the casing 11 and is fitted to be contiguous with hydraulic cylinder 14. Assembly 17 is also preheated and is then lowered into casing 11 and is aligned to be contiguous with assembly 16. The mandrel 62 and mandrel head 57 are aligned as shown. Hydraulic cylinder 15 is screwed into place in the open upper end 13. The pipe assembly 88 is placed in position and is connected to a fluid, for example pressurized air which is introduced into the assembly 17. Hydraulic pressure of, for example, about 633 kilograms force per square centimeter (9000 pounds per square inch) is applied by pressurizing means 15 which clamps the press together with $26.6 \times 10^4$ N (30 tons of force) and prevents lateral and axial movement of the mandrel head 57 and other tooling in the press during extrusion. Simultaneously, hydraulic pressure is applied to piston 21 in cylinder 14 which in turn transmits the pressure to plug 30 and hollow piston 37 and pressurizes the fluid 51. Initially, the fluid 51 and the preform 53 are compressed by the force generated in cylinder 14. When the preform 53 and fluid 51 are fully compressed to a pressure of about 520 kilograms force per square centimeter (7,400 pounds per square inch gage) or higher, extrusion begins. The pressure remains relatively constant throughout the extrusion time. As noted above, during extrusion a portion of the hydraulic fluid 51 forms a thin film between the surfaces 53a and 53b of the preform 53 and the surfaces of the mandrel head 57 and the die 29, respectively, to provide lubrication for the preform 53 as it is being extruded. A lubricating and/or cooling fluid, preferably air at a desired pressure, for example 2.81 to 6.33 kilograms force per square centimeter (40 to 90 pounds per square inch gage), is fed into the chamber 82 through bore 67 and radial orifices 70. The air forms a flowing film or cushion between the extrudate 53c and the mandrel surface to lubricate the extrudate 53c. The fluid flows along the surface 68, around the extrudate 53c and along surface 74 to radial orifices 79 to cool the extrudate 53c. The fluid then flows along outer surface 76 through the slots 86a in washer 86 and along space between plug 87 and the pressurizing means 15 passes and out of the apparatus through the top of pressurizing means 15. The use of the lubricating and/or cooling fluid assures a smooth substantially wrinkle-free surface on the extrudate or conduit 53c which is comprised of the same number of layers of thermoplastic crystalline polymers as in the preform. After a time, for example about one minute, the preform 53 has been extruded and the hydraulic pressure in the hydraulic cylinders 14 and 15 is relieved. Hydraulic cylinder 15 is removed from the press 10. The assembly 17 and the extrudate 53c are removed from the press 10. A portion of the preform remains unextruded and is retained on the mandrel head 57. The extrudate 53c is separated from the unextruded portion 53f by slitting with any conventional known cutting tool, such as a slitter knife. The individual layers of the thermoplastic crystalline polymers are separable, and can be separated into discrete films or can be formed into multilayered film.

Figure 6:
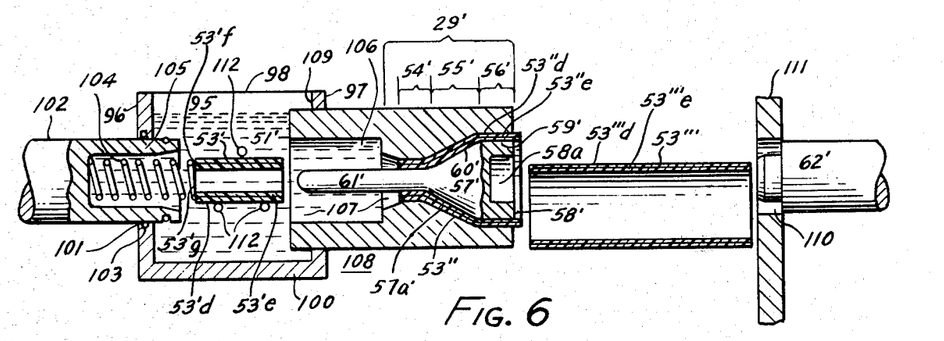
FIG. 6 shows the apparatus of FIG. 5 after the thermoplastic crystalline polymer preform has been extruded.

While we have shown a batch process, it is also possible to produce the extrudate of the invention by a semi-continuous process using an apparatus such as shown by way of example in FIGS. 5 and 6.

Figure 7:
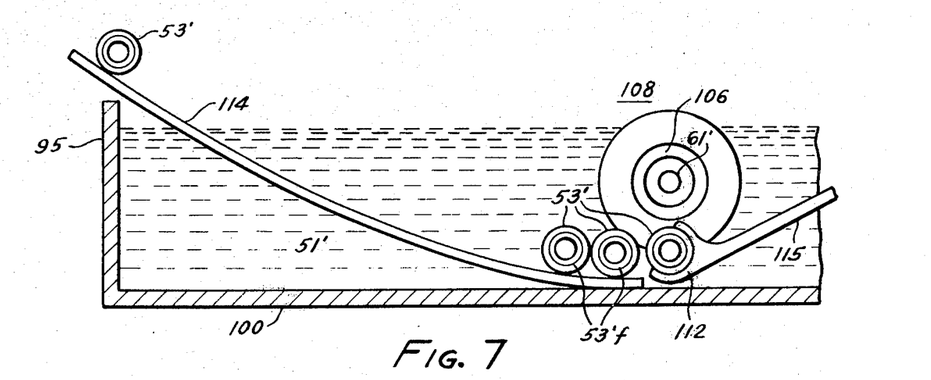
FIG. 7 shows a cross-sectional view of a portion of a heating tank which is used to preheat the preform.

FIG. 5 is an elevation view in cross-section of a press in which a preform 53' comprised of two concentric layers 53'c and 53'e of the thermoplastic crystalline polymers is ready to be extruded. The layers 53'd and 53'e are welded together at 53'f on the rear surface 53'g. FIG. 6 shows the same apparatus as FIG. 5 in which the preform 53' has been extruded into an extrudate or conduit 53''' having the same number of layers as the preform 53' which is being ejected from the apparatus. FIG. 7 is an elevation view in cross-section of the fluid tank showing several preforms 53' being heated prior to being charged into the apparatus.

The extrusion apparatus shown in FIGS. 5, 6 and 7 includes an outer support structure (not shown), a generally rectangular, tank 95 with an open top and bounded by two side walls 96 and 97, two end walls 98 and 99 (not shown), and a bottom 100. A hydrostatic and lubricating fluid 51' which is also used to heat the preform 53' fills the tank 95. The fluid 51' is heated by internal or external conventional means, such as a heating coil (not shown), to a temperature which is between the 4.64 kilograms force per square centimeter (66 pounds per square inch) heat deflection temperature and 8 C. (14 F.) below the crystalline melt temperature of the polymers in the preform. Piston 102 is fully movable through opening 101 in wall 96. A seal 103 prevents leakage of hot fluid. One end (not shown) of piston 102 is attached to and activated by hydraulic means. A spring-loaded cavity 104 in end 105 guides the preform 53' into the rear or pressure chamber portion 106 of axial cavity 107 in die assembly 108. The forward portion of die assembly 108 is a die 29' comprised of a first axial land section 54', a second axial land section 56' and a diverging section 55' connecting the first and second land sections 54' and 56'. Die assembly 108 is mounted in an opening 109 in wall 97. A mandrel head 57' supported by mandrel 62' is axially positioned within cavity 107. The mandrel head 57' has a recessed base surface 58', a generally cylindrical lower portion 59', a generally diverging conical upper portion 60' and an elongated nose 61'. The lower portion 59' and the diverging upper portion 60' and the portion of the nose 61' in cooperation with die 29' define an orifice 57a' which has converging walls but has a generally diverging geometry. The partially extruded preform 53'' holds the mandrel head 57' in place during ejection of the product and while heated preform 53' is being placed in position to be extruded. A projection on the front face of mandrel 62' fits into the recess 58a to form a male-female fit whereby any movement of the mandrel head 57' is virtually eliminated. The other end (not shown) of the mandrel 62' is attached to a hydraulic cylinder (not shown). The mandrel 62' is freely movable through an opening 110 in stripper plate 111. The extrudate 53''' is stripped from the mandrel 62' when the mandrel 62' is withdrawn through opening 110 and is ejected from the apparatus. The preform 53° is shown in the fingers 112 of a manipulator (not shown). FIG. 7 is a partial view in cross-section of the tank 95. A sloping ramp 114 as shown allows preform 53' to be fed into the hot fluid 51'. The arm 115 and fingers 112 of the manipulator may be any type well known in the art.

FIG. 5 shows a multilayer preform 53' in pressure chamber 106. Pressure is applied to the preform 53' by a piston 102 through hydrostatic fluid 51'. At first, the preform 53' is comopressed until a pressure is reached at which the preform 53' begins to be extruded through orifice 57a' onto the mandrel 62'. The layers in preforms 53' and 53'' are substantially simultaneously expanded circumferentially and elongated axially. As noted previously, the expansion in the circumferential direction is at least 100% and preferably is at least 200 percent. The axial elongation may be less than the circumferential expansion but it is preferred that the axial elongation be at least 50 percent and preferably 100 percent of the circumferential expansion.

Although a hollow preform and a mandrel head having an elongated nose have been shown, the use of a solid multilayer preform and a mandrel head with a sharp needle-like nose and mandrel-heads of various shapes and sizes are well within the scope of this invention. In all cases the preform must be extruded in the solid state and the layers are substantially simultaneously expanded circumferentially and elongated axially with the circumferential expansion being 100 percent and preferably 200 percent.

As explained previously, the circumferential expansion and axial elongation of the preform are controlled by the converging cross-sectional area and the diverging geometry of the annular orifice through which the preform is extruded. In all extrusions, the increase of the inside and outside diameters of the layers in the preform to the layers in the extrudate must be sufficient to expand the median circumference of each polymer by at least 100 percent and preferably 200 percent.

As noted above, a portion of the press in which the preform, hydrostatic fluid and mandrel-head are assembled, is heated to a temperature within the range of about 4.64 kilograms force per square centimeter (66 pounds per square inch) heat deflection temperature to 8 C. (14 F.) below the crystalline melt temperature of each polymer in each layer. The crystalline melt temperature of a polymer is that temperature at which the polymer melts and is no longer crystalline. The crystaline melt temperature varies for each polymer, therefore the temperature to which each thermoplastic crystalline polymer is heated prior to extrusion also varies. The thermoplastic crystalline polymer is extruded at a pressure and a strain-rate commensurate with good extrusion practices which will prevent surface tearing, loss of dimensional control and melting of the thermoplastic crystalline polymer. In extrusion, the temperature, pressure, strain-rate and degree of elongation are interdependent, therefore if three of the parameters are specified the fourth is fixed. The maximum extrusion rate is a function of the thermoplastic crystalline polymers being extruded, the temperature at which extrusion occurs and the degree of elongation of the thermoplastic crystalline polymers. The extrusion rate may be expressed as the average strain rate which is defined as the product of the circumferential and axial elongation divided by the time required for the thermoplastic crystalline polymers to pass through the expansion zone. As an example, the highest strain rate observed for a successful extrusion of an isotactic polypropylene hollow preform which is 2.54 centimeters (1 inch) in outside diameter and 12.7 centimeters (5 inches) long and has a wall thickness of 0.67 centimeter (0.266 inch), at a temperature of 113 C. (235 F.) into a conduit which is 5.08 centimeters (2 inches) outside diameter, 17.78 centimeters (7 inches) long and having a wall thickness of 0.14 centimeter (0.055 inch) with a circumferential expansion coefficient of 2.6 and an axial elongation coefficient of 1.9, was 8 $\sec^{-1}$. On a practical basis, it is possible to extrude an isotactic polypropylene preform into a conduit having a diameter of 40.64 centimeters (16 inches) at a strain rate of 6.7 $\sec^{-1}$ to yield an instantaneous throughput of about 10,884 kilograms (24,000 pounds) per hour. The preform is extruded over a generally conically-shaped mandrel head through an annular orifice formed by the outer surface of the mandrel head and the surface of the die. While the mandrel-head and die have generally diverging geometries, the annular orifice formed by their diverging surfaces has a converging cross-sectional area. The layers in the preform are thus substantially simultaneously expanded circumferentially and elongated axially resulting in an extrudate or conduit having several layers each of which has a larger outside diameter, a greater length and a wall thickness smaller in cross-sectional area than the same layer in the starting preform. The divergent geometry of the annular orifice controls the circumferential expansion or elongation while the convergence of the surfaces of the orifice, i.e. the converging cross-sectional area, controls the axial deformation or elongation. Such elongations may be varied independently to obtain desired circumferential and axial properties. Stating this relationship in terms of the preform and product geometry, the increase in the median circumference of the layers in the preform to the median circumference of the layers in the extrudate defines the circumferential deformation while the reduction of the cross-sectional area of the walls of the layers in the preform to that in the extrudate controls the axial deformation. By median circumference we mean the circumference which divides the cross-sectional area of either the layers of the preform or conduit in half. By median diameter we mean the diameter of the median circumference. An elongation coefficient is obtained by dividing the extruded dimension by the original unextruded dimension.

Whenever tensile impact strengths are shown such strength has been determined by ASTM D1822 short specimen and ultimate tensile strength is determined by ASTM D638 unless otherwise stated.

The film of the invention can be used, for conventional purposes. e.g., heat-shrink packaging of various products.

The film of the invention can be made from any substantially non-oriented crystalline homopolymer or copolymer having a crystallinity of at least 45 percent, a relatively sharp crystalline melting point observed by differential thermal analysis and having a structure containing long chain molecules which solidify in the form of spherulitic crystalline aggregates. In addition, the polymer can be softened and formed by heat or stress and its structure can be oriented by drawing and stretching at a temperature which is between its glass transition temperature and crystalline melting point as shown by major improvements in properties, such as ultimate tensile strength and tensile impact strength. The polymer can have a weight average molecular weight between $10^4$ and $10^7$. Such thermoplastic polymers include orientable polyolefins, for example isotactic polypropylene, high density polyethylene; ultra high molecular weight polyethylene; polyamides, for example nylon 6/6; polyacetals, for example polyoxymethylene; polyesters, for example polybutylene terephthalate, and polyvinyl alcohol.

A typical structure of a non-oriented thermoplastic crystalline polymer, for example, isotactic polypropylene, which can be processed by the method herein described has a structure comprised of substantially non-oriented spherulitic crystalline aggregates. It is generally recognized that when the polymer solidifies on coling from the molten state crystalline aggregates grow radially from nuclei. The aggregates are referred to as spherulites. The spherulitic crystalline aggregates are generally polygonal in shape when viewed on polished faces. While the structure of the polymer is predominantly crystalline in nature, small areas of non-crystalline or amorphous structures may become entrapped in and between the spherulites during their growth and remain entrapped during subsequent processing. The spherulitic crystalline aggregate structure of the polymer is retained in the extrudate formed by the solid state hydrostatic extrusion method of the invention. However, the aggregates are deformed by compressive forces and as a result the aggregates are compressed in a plane transverse to the plane of the rigid conduit as it is radially expanded and are planar oriented, i.e. are biaxially oriented in the plane of the conduit. It the case of film, the spherulitic crystalline aggregates are compressed in a plane transverse to the plane of the film and are planar oriented.

Figures 8, 9, 10:
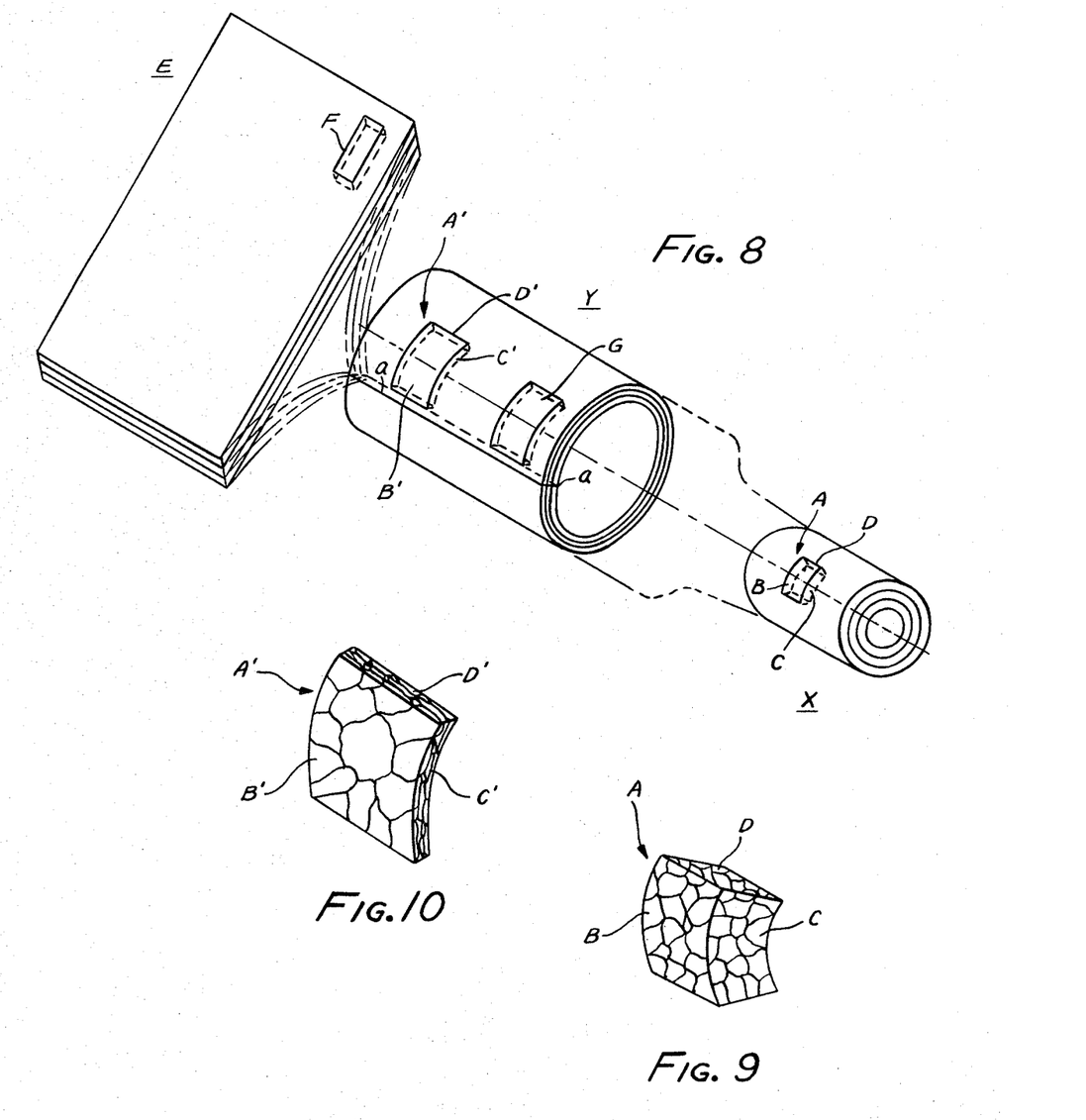
FIG. 8 is a diagrammatic representation of the solid state hydrostatic extrusion of a preform comprised of a plurality of concentric tubular-like discrete layers of the same or different thermoplastic crystalline polymer(s) into a rigid conduit comprised of the same number of concentric tubular-like discrete layers as the preform each layer having a desired thickness and a product comprised of a plurality of layers which can be separated into individual film. The Figure also shows the location of test coupons cut from the outer layer of the preform, the conduit and films.
FIG. 9 is a pictorial representation of a representative structure of the polymers in the preform as seen in test coupon D cut from the outermost layer of the preform.
FIG. 10 is a pictorial representation of a representative structure of the polymers in the conduit and films as seen in test coupon D' cut from the outermost layer of the conduit.

A pictorial representation of the method of the is shown in FIG. 8. A typical structure of a polymer which can be processed by the method is shown in FIG. 9 and a typical structure of an extrudate made by the method is shown in FIG. 10.

Turning to the FIGURES, as shown in FIG. 8, X identifies a typical preform used in the method to produce film. In the instant case the preform X is comprised of three layers of equal thickness. We have shown a preform comprised of three layers of the same thermoplastic crystalline polymer, however preforms of two layers or many layers of various thicknesses and of compatible thermoplastic crystalline polymers can be used provided the preform can be heated to a desired temperature without exceeding the melt temperature of any polymer in the preform and the coefficient of friction between the congruous surfaces is such that stick-slip extrusion is eliminated. The extrudate of the invention is identified as Y. Test coupons A in FIG. 9 and A' in FIG. 10 were cut from the outer layers of preform X and conduit Y, respectively, as shown. The outer surfaces B and B', and transverse surfaces C and C' and D and D' were polished, etched and examined at a magnification of 100× by light optical microscopy.

The surfaces B, C and D showed a typical spherulitic crystalline aggregate structure generally found in thermoplastic crystalline polymers.

Surface B' shows a structure comprised of platelet-like spherulitic crystalline aggregates generally polygonal in shape. Surfaces C' and D' show that the aggregates are radially compressed into relatively thin lamellae elongated in both the circumferential and axial directions and oriented in the plane of the conduit wall, i.e. oriented circumferentially and axially.

The multilayered product E was formed by slitting the conduit Y along line a—a as shown in FIG. 8. A test coupon F was cut from the uppermost layer as shown. Each face and transverse sides were polished, etched and examined as described above. The structure appeared to be identical to the structure in coupon A' cut from the outer layer of the conduit.

In contrast to the structure described above, when isotactic polypropylene is formed into film by either of the conventional stretch processes the spherulitic crystalline appregates are pulled along the directions of deformation and are elongated, i.e. the aggregates are stretched to biaxially orient the film. At 70 percent biaxial orientation a substantial portion of the spherulitic crystalline aggregate structure is destroyed and is no longer visible on polished surfaces. The structure is destroyed at 100 percent biaxial orientation as evidenced by examining polished and etched specimens under an optical microscope.

As shown in FIG. 8, a second coupon G was cut from the outermost layer of the conduit Y and was placed in an oil bath and heated to a temperature of 165° C. (330° F.) without any restraining pressure being applied. The coupon was held at temperature for fifteen minutes. The coupon reverted to about 85 percent of the shape, size and structure of a coupon cut from the preform X. The substantially complete recovery of the structure of equi-axed spherulitic crystalline aggregates appearance indicates that the strain induced in the spherulitic crystalline aggregate structure by the compressive forces employed in the method was homogeneously distributed throughout the polymer. As a result, the polymer retained its memory and density.

Examination of the structure in coupons A' and F did not elicit the formation of microvoids nor the enlargement of existing microvoids. It is postulated that the lack of microvoids and the formation of the unique spherulitic crystalline aggregate microstructure, wherein the aggregates are compressed transversely to the plane of the film and are biaxially oriented in the plane of the film, is responsible for the increase in the tensile impact strength at all temperatures and the unusual low temperature tensile impact strength, a ratio to the tensile impact strength (referred to as TIS) over the ultimate tensile strength (referred to as UTS) determined by ASTM D1822 S-type specimens which is at least 50 percent greater than that ratio determined for a thermoplastic polymer of the same composition which has been biaxially oriented to the same ultimate strength level by conventional solid state deformations, such as blow molding, tentering and the like, and the retention of essentially the same density and reduced permeability of the polymer.

In the solid state hydrostatic extrusion process of this invention, a preform of thermoplastic crystalline polymer in the form of a rigid multilayered conduit is heated to a temperature between the 4.64 kilograms force per square centimeter (66 pounds per square inch) heat deflection temperature as determined by ASTM D-648 and about 8° C. (14° F.) below the crystalline melt temperature of the low polymer and is extruded by hydrostatic fluid pressure through an extrusion zone at a strain rate which does not exceed 20 seconds$^{-1}$ and preferably is less than 10 seconds$^{-1}$. The polymers are substantially simultaneously expanded circumferentially and elongated axially by forces which are compressive in nature. The circumferential expansion is at least 100 percent and is preferably at least 200 percent. The axial elongation may be at least 50 percent and most preferably is equal to the circumferential expansion.

The temperature to which the preform is heated for solid state hydrostatic extrusion must be such that the crystalline melt temperature of the lowest melting polymer will not be exceeded during extrusion and excessive extrusion pressures resulting in stick-slip extrusion and its attendant overheating problems are not permitted. Broadly, the polymers in the preform may be heated to any temperature within the range of their 4.64 kilograms force per square centimeter (66 pounds per square inch) heat deflection temperature and about 8° C. (14° F.) below their crystalline melt temperatures. However, a temperature range between about 50° C. (90° F.) and 18° C. (32° F.) below the crystalline melt temperatures is preferred but the most preferred range is between 30° C. (54° F.) and 18° C. (32° F.) below its crystalline melt temperature. The temperature range is dependent upon the polymers, the extrusion rate and the reduction ratio. By way of example, the broad temperature ranges, the preferred temperature ranges and the most preferred temperature ranges at which some polymers may be extruded in the method of the invention are shown in Table I, below.

TABLE NO. I

| | Extrusion Temperatures | | |
| --- | --- | --- | --- |
| | Broad Range | Preferred Range | Most Preferred Range |
| High Density Polyethylene | 71 C.(160) F.) 129 C.(265 F.) | 71 C.(160 F.) 109 C.(247 F.) | 104 C.(220 F.) 109 C.(247 F.) |
| Polypropylene | 102 C.(216 F.) 162 C.(324 F.) | 102 C.(216 F.) 152 C.(306 F.) | 121 C.(250 F.) 152 C.(306 F.) |
| Polyester | 154 C.(310 F.) 217 C.(423 F.) | 154 C.(310 F.) 207 C.(405 F.) | 188 C.(370 F.) 207 C.(405 F.) |
| Nylon 6/6 | 221 C.(430 F.) 242 C.(468 F.) | 221 C.(430 F.) 232 C.(450 F.) | 221 C.(430 F.) 232 C.(450 F.) |

In the preceding description the extrudate is slit after processing. It is possible to use a preform comprised of a plurality of concentric tubular-like discrete layers which are slit prior to extrusion. Slitting prior to extrusion has substantially no effect on the extrusion process and an extrudate having a plurality of slit layers is produced. The layers thereof can be separated into discrete flexible films.

As noted previously, a substantially non-oriented thermoplastic crystalline polymer which contains particles of a filler material can be processed by the method of the invention into film and subsequently an article of manufacture by the processes described above. An article of manufacture produced as described above is novel in itself since it will have a polymer matrix which is biaxially oriented and particles of a filler material which may also be oriented if they are other than spherical. Such orientation of both the structure and particles of filler material has not been possible with solid state high draw ratio stretch orientation processes, for example, tentering, blow molding and other known stretching processes. Such stretching processes are useful in biaxial orientation, however as noted previously such stretching destroys the original spherulitic crystalline structure and produces voids in the polymer matrix adjacent the particles of the filler or enlarges microvoids which existed in the original structure thereby adversely affecting the characteristics and properties of the product.

The biaxially oriented filled thermoplastic crystalline polymer film produced by the prior art solid state process mentioned above do not have a tensile impact strength which is 5 times and an ultimate tensile strength which is 1-¾ times that of an unoriented polymer of the same composition. Nor do such film have a ratio of tensile impact strength to ultimate strength (TIS/UTS) which is at least 50 percent greater than that ratio determined for a thermoplastic crystalline polymer of the same composition which has been biaxially oriented to the same ultimate tensile strength level by conventional solid state deformations, for example blow molding, tentering and the like. The voids around the particles of the filler adversely affect the appearance, stiffness and density of the product.

As noted, it is within the scope of this invention to produce multilayered rigid extrudates from multilayered preforms.

It is also possible by the method of the invention to extrude a multilayered thermoplastic crystalline polymer to produce an extrudate having an overall thickness greater than about 0.03 of an inch (0.127 mm) and to re-extrude such extrudate or a plurality of such extrudates of different diameters to form a composite preform any number of times by the method of the invention to produce a final extrudate having layers of polymers which have greater orientation and improved properties than the original extrudate. An extrudate having a thickness greater than 0.03 of an inch (0.13 mm) and a biaxial orientation from a 2.5 by 2.5 circumferential and longitudinal elongation ratio, is folded on itself or cut into desired size, and fabricated into an extrusion preform with multiple layers and re-extruded to produce an extrudate which has a biaxial orientation associated with a 5×5 circumferential and longitudinal elongation ratio.

In a specific example of the invention, a preform having an outside diameter of one inch (25.4 mm) and an inside diameter of 0.502 inch (12.75 mm) and consisting of three cylindrical concentric layers each having a wall thickness of 0.083 inch (2.11 mm) and outside diameters of 0.668, 0.834 and 1.0 inches (16.97, 21.18 and 25.40 mm), respectively was prepared for solid state hydrostatic extrusion. Each of the cylinders was formed from isotactic polypropylene having a density of 0.909, a crystallinity of 68.3%, a crystalline melt temperature of 168 C., a melt flow index of 0.4 dg. per minute, an ultimate tensile strength of 387 kilograms force per square centimeter, and a tensile impact strength of 3.55 joules per square centimeter at 24 C. The cylinders were fusion welded together at their end surfaces.

The preform was heated to a temperature of 132 C. and was placed in the container assembly of a hydrostatic extrusion press containing castor oil as the extrusion fluid. The assembly and castor oil were preheated to 132 C. The preform was extruded into an extrudate which had an outside diameter of 2 inches (50.80 mm) and an inside diameter of 1.86 inches (47.24 mm). The wall thickness of each of the concentric cylinders was reduced from 0.027 to 0.018 inch (0.69 to 0.46 mm). The extrudate was slit and the layers separated. Samples were cut from each layer for test purposes and for microscopic examination of the structure. Results of the tests are shown below.

| Mechanical Property Tested in the Circumferential Direction | Outer Layer | Intermediate Layer | Inner Layer |
|---|---|---|---|
| Ultimate tensile strength | 930 kgf/cm² 13,220 psi | 1120 kgf/cm² 16,000 psi | 4290 kgf/cm² 20,300 psi |
| Tensile impact strength | 126 Joules/cm² 600 ft #/in² | 126 Joules/cm² 600 ft #/in² | 168 Joules/cm² 800 ft #/in² |
| Final thickness | 0.69 mm 0.027 in | 0.64 mm 0.025 in | 0.46 mm 0.018 in |

Microscopic examination by optical light microscopy shows the microstructure of each layer to be comprised of spherulitic crystalline aggregates compressed transversely to the plane of the sheet and biaxially oriented in the plane of the film.

A cylindrical preform 1 inch outside diameter and 0.502 inch (12.75 mm) inside diameter comprised of two concentric cylinders 0.126 inch (3.20 mm) in wall thickness of the isotactic polypropylene polymer described above were fusion welded at their end surfaces and the preform was hydrostatically extruded in the solid state in the same manner as described above. A double-layered tubular extrudate having an outside diameter of 2.141 inch (54.38 mm) and an inside diameter of 2 inches (50.80 mm) was made. The outer layer had an average thickness of 0.0385 inch (0.98 mm) and the inner layer 0.032 inch (0.81 mm). The extrudate was slit with a knife slitter and the layers were separated into flexible films. Test samples were cut from each layer. The results of the tests are shown below:

| Mechanical Property Tested in the Circumferential Direction | Outer Layer | Inner Layer |
|---|---|---|
| Ultimate tensile strength | 936 kgf/cm² 13,300 psi | 1140 kgf/cm² 16,300 psi |
| Impact tensile strength | 93 Joules/cm² 457 ft. #/in² | 97 Joules/cm² 478 ft. #/in² |
| Final thickness | 0.98 mm .0385 inch | 0.81 mm .032 inch |

Examination of a sample by optical light microscopy shows the structure to be comprised of spherulitic crystalline aggregates compressed transversely to the plane of the film and biaxially oriented in the plane of the film.

We claim:

1. A rigid conduit comprised of a plurality of tubular-like, concentric, discrete separable layers of at least one thermoplastic crystalline polymer, each layer being a flexible film having a substantially uniform thickness within the range of 0.13 and 0.76 mm and characterized by a structure of platelet-like, discrete, generally polygonal spherulitic crystalline aggregates radially compressed and biaxially oriented in the plane of the wall of the conduit, each of the films being characterized by substantially the same density, decreased gas permeability and an increased thermal conductivity, compared to a corresponding film of the non-oriented thermoplastic crystalline polymer or of the same thermoplastic crystalline polymer which has been biaxially oriented to the same degree by conventional stretch orienting processes, a tensile impact strength at 24 C. which is at least 5 times the tensile impact strength at 24 C. of a corresponding film of the non-oriented polymer, a tensile impact strength at −45 C. which is not less than 20 percent of the tensile impact strength of 24 C. and a ratio of tensile impact strength over ultimate tensile strength which is at least 50 percent greater than such ratio determined for a corresponding film of the polymer biaxially oriented to the same degree by conventional stretch orienting processes.

2. A method for producing the rigid conduit of claim 1, comprising:
  (a) preheating a preform comprised of a plurality of concentric tubular-like discrete layers of at least one thermoplastic crystalline polymer,
  (b) hydrostatically extruding the preform in a solid state through an extrusion zone comprising a converging wall, converging cross-section and a diverging geometry into an extrudate comprised of a plurality of concentric tubular-like discrete layers, each layer of which has a substantially uniform thickness within the range of 0.13 and 0.76 mm, and
  (c) cooling the extrudate.

3. The method of claim 2 including the step of slitting the extrudate.

4. The method of claim 2 wherein the layers in the preform are slit prior to preheating.

5. The method of claim 3 comprising the further step of separating the layers of the extrudate into discrete layers of film.

6. The method of claim 4 comprising the further step of separating the layers of the extrudate into discrete layers of film.

7. The method of claim 3 comprising the further step of processing the layers in the extrudate into film comprised of a plurality of layers.

8. The method of claim 4 comprising the further step of processing the layers of the extrudate into film comprised of a plurality of layers.

9. A flexible film comprised of at least one thermoplastic crystalline polymer having a substantially uniform thickness between 0.13 and 0.76 mm and characterized by a biaxially oriented structure of platelet-like, discrete, generally polygonal spherulitic crystalline aggregates compressed in a plane transverse to the plane of the film and biaxially oriented in the plane of the film and further characterized by substantially the same density, decreased gas permeability, increased thermal conductivity compared to a corresponding film of the non-oriented thermoplastic crystalline polymer or of the same thermoplastic crystalline polymer which has been biaxially oriented to the same degree by conventional stretch orienting processes, a microstructure substantially devoid of process induced microvoids and microfibrils other than those formed during melt processing, a tensile impact strength at 24 C. (75 F.) which is at least five times and an ultimate tensile strength which is at least one and three quarters that of a corresponding film of the thermoplastic crystalline polymer in an non-oriented state when tested in the plane of the film and the tensile impact strength at −45 C. (−50 F.) which is not less than 20 percent of the tensile impact strength at 24 C. (75 F.) and a ratio of tensile impact strength over ultimate tensile strength which is at least 50 percent greater than such ratio determined for a corresponding film of the polymer biaxially oriented to the same degree by conventional stretch orienting processes.

10. The film of claim 9 wherein the thickness of the film is between 0.38 and 0.76 mm.

11. The film of claim 9 wherein the thickness of the film is between 0.25 and 0.76 mm.

12. The film of claim 9 wherein the thermoplastic crystalline polymer contains at least 5 and not more than 80 percent of at least one particulate filler.

13. The film of claim 9 wherein the thermoplastic crystalline polymer is a polyolefin.

14. The film of claim 13 wherein the polyolefin is isotactic polypropylene.

15. The film of claim 13 wherein the polyolefin is high density polyethylene.

16. The film of claim 13 wherein the polyolefin is ultra high molecular weight polyethylene.

17. The film of claim 9 wherein the thermoplastic crystalline polymer is a polyamide.

18. The film of claim 17 wherein the polyamide is nylon 6/6.

19. The film of claim 17 wherein the polyamide is nylon 6/10.

20. The film of claim 17 wherein the polyamide is nylon 11.

21. The film of claim 9 wherein the thermoplastic crystalline polymer is a polyacetal.

22. The film of claim 9 wherein the thermoplastic crystalline polymer is a polyester.

23. The film of claim 9 wherein the thermoplastic crystalline polymer is polybutylene terephthalate.

24. The film of claim 9 wherein the thermoplastic crystalline polymer is polyvinyl alcohol.

25. The film of claim 12 wherein the filler is talc.

26. The film of claim 12 wherein the filler is calcium carbonate.

27. The film of claim 12 wherein the filler is mica.

28. A method for producing a flexible film of claim 9 comprising:
  (a) preheating a preform comprised of a plurality of concentric tubular-like discrete layers of at least one thermoplastic crystalline polymer,
  (b) hydrostatically extruding the preform in a solid state through an expansion zone comprising a converging wall, a converging cross-section and a diverging geometry, into an extrudate comprised of a plurality of concentric tubular-like discrete layers, each layer of which has a substantially uniform thickness within the range of 0.13 and 0.76 mm,
  (c) cooling the extrudate, and
  (d) separating the layers into discrete flexible films.

29. The method of claim 28 wherein the concentric layers of step (a) are interlocked at their rear portions.

30. The method of claim 28 wherein the layers are fusion welded.

31. The method of claim 28 wherein the interlocking is achieved by fabrication using a sheet folded on itself and formed into a preform shape.

32. The method of claim 28 wherein the interlocking is by a keying arrangement.

33. The method of claim 28 wherein each layer in the preform is expanded circumferentially by at least 100% in step (b).

34. The method of claim 33 wherein the circumferential expansion and the axial elongation are substantially equal.

35. The method of claim 24 wherein the extrudate of step (c) is re-extruded a plurality of times as in step (c) prior to being processed by step (d).

* * * * *